3,265,645
LACQUER COMPOSITIONS AND ARTICLES
COATED THEREWITH
Charles H. Coney and William E. Wright, Kingsport,
Tenn., assignors to Eastman Kodak Company, Rochester, N.Y., a corporation of New Jersey
No Drawing. Filed Nov. 19, 1964, Ser. No. 412,310
14 Claims. (Cl. 260—15)

This application is a continuation-in-part of the Coney et al. application, U.S. Serial No. 151,412, filed November 6, 1961, now abandoned.

This invention relates to the production of glossy pigmented surfaces or wrinkle finishes and more particularly to lacquers comprising cellulose acetate butyrate, urea-formaldehyde resin and epoxy compound.

It is frequently desirable to coat articles with a glossy pigmented film, or, in some instances, with a wrinkle finish. Oleoresinous enamels produce high gloss finishes but lack the high gloss retention and chalk resistance of lacquer films. While lacquers have been employed to produce glossy coatings, formulations designed to air-dry quickly to a tack-free surface for production coatings of various articles, such as automobiles, often result in a low gloss film. Such coatings must be rubbed and buffed with an abrasive to produce a glossy surface. A pigmented lacquer which will air-dry to a tack-free film in a short time, producing a highly glossy surface without the necessity of rubbing or buffing, appears desirable.

Wrinkle finishes are currently being used for coating a variety of articles, such as office equipment, laboratory apparatus and instruments. Such finishes are generally produced from various oleoresinous compositions such as China-wood oil, tung oil, maleic polyesters, pentaerythritol-linseed alkyds and the like. The principle behind such coatings is to cause the surface of the oleoresinous type finish to swell by rapid curing using a high concentration of a catalyst such as cobalt naphthenate. The process involves cross-linking of conjugated double bonds. These conventional wrinkle coatings often require about 1 to 2 hours of baking time, but do not cure completely for weeks after the baking period is completed. Some oleoresinous-type wrinkle finishes require preliminary synthesis, cooking, or bodying procedures. We have now found that certain lacquer coating compositions may be cured to wrinkle finishes superior to those of the oleoresinous types in a number of respects.

One object of our invention is to provide a pigmented lacquer coating which will produce a highly glossy finish. Another object of our invention is to produce a pigmented protective coating which has good gloss retention and chalking resistance even when exposed to exterior weather conditions. A further object of our invention is to produce decorative coatings having good adhesion to metal surfaces, good flexibility, and high resistance to abrasion and scuffing. Still another object of our invention is to produce a lacquer coating composition in a catalyzed, one-package stable solution. Still another object of our invention is to provide lacquer coating compositions which may be cured to a wrinkle finish. Other objects of our invention will appear herein.

We have found that lacquer compositions, the essential constituents of which comprise in a solvent therefor (a) 20–40 parts cellulose acetate butyrate,
(b) 20–60 parts of an alkylated urea-formaldehyde resin,
(c) 10–30 parts of an epoxy compound, and
(d) 0.1–10 parts of an acid catalyst furnish coating of a high gloss. We have also found that lacquer compositions, the essential constituents of which comprise in a solvent therefor (a) 20–40 parts cellulose acetate butyrate,
(b) 20–60 parts of an alkylated urea-formaldehyde resin,
(c) 10–30 parts epoxy compound,
(d) 0.1–10 parts of an acid catalyst, and
(e) 0.1–10 parts of a lower aliphatic amine furnished coatings which may be cured to a wrinkle finish.

Our invention will be further illustrated by the following examples. (Examples 1–4 illustrate the preparation of coatings of high gloss in accordance with our invention.)

Example 1

The following composition was prepared:

| Ingredients: | Weight percent |
|---|---|
| Cellulose acetate butyrate (one-half second viscosity) [1] | 8.1 |
| Titanium dioxide | 6.9 |
| Butylated urea-formaldehyde resin [2] | 13.3 |
| Polyglycidyl ether of an aliphatic polyol [3] | 4.6 |
| 50% p-toluene sulfonic acid-butanol mixture | 0.6 |
| Toluene | 24.3 |
| Isobutyl acetate | 20.0 |
| Methylethylketone | 15.0 |
| Isobutyl alcohol | 7.2 |

[1] Commercially available as Half Second Butyrate.
[2] Available on the market as Uformite F-240
[3] Available on the market as Epon 812.

A thin film of this composition was sprayed on untreated aluminum and cured at 300° F. for 30 minutes giving a hard, insoluble, scuff-resistant coating with high specular gloss. The coating was exposed for 2000 hours in a weather-o-meter and was still in excellent condition. The film exhibited good underwater adhesion to the untreated aluminum. The film was formed over a one-fourth inch mandrel without cracking. The lacquer solution was stable for over one year.

Example 2

Cellulose acetate butyrate, having a viscosity of about 0.1 second and a butyryl content of about 37% was substituted for the one-half second butyrate in Example 1. A high gloss coating was obtained.

Example 3

Cellulose acetate butyrate, having a viscosity of 20 seconds and a butyryl content of about 37%, was substituted for the one-half second butyrate in Example 1. A glossy coating with essentially the same properties as listed in Example 1 was obtained.

Example 4

An epoxy resin (Epon 836) having the following formula:

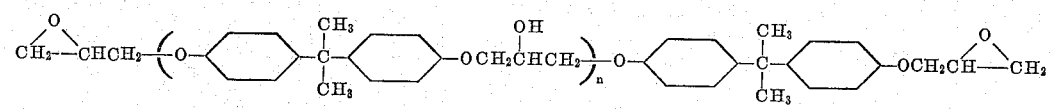

in which $n$ is a value sufficient to produce an epoxide equivalent of 280–350 was substituted for the polyglycidyl ether of an aliphatic glycol in Example 1. Glossy films were obtained which had properties equivalent to those obtained in Example 1.

In general, the sulfonic acid curing catalysts disclosed in U.S. Patent 2,631,138 may be employed in our lacquer compositions as catalysts. We prefer to employ p-toluene sulfonic acid, although especially satisfactory results may be obtained with the following acids as catalysts: p-chlorobenzene sulfonic acid, p-nitrobenzene sulfonic acid, α-naphthalene sulfonic acid, 4-nitrochlorobenzene-2-sulfonic acid, dodecylbenzene sulfonic acid, and sulfoacetic acid monohydrate. The amount of acid catalyst preferably is between about 0.1 and 5% of the non-volatile constituents, and may vary depending on the temperature and length of time used in curing the film.

We may employ an alkylated urea-formaldehyde resin. Especially satisfactory results are obtained with a butylated urea-formaldehyde resin having the following proportions: 1 mole urea, 1–2 moles formaldehyde, and 0.5–2 moles of butyl alcohol, although a higher molecular weight aliphatic monohydric alcohol may be substituted for a portion of the butanol.

The epoxy compounds which are satisfactory for use in these compositions, the reaction products of epichlorohydrin and a polyhydric compound, such as bis-phenol and ethylene glycol, or some other higher molecular weight glycol, preferably have an epoxide equivalent range (see page 6 of Shell bulletin on Epon resins, Technical Publication SC: 52–31) of 140–375. Polyglycidyl ethers of aliphatic polyols give especially satisfactory results. Other epoxy compounds which may be advantageously employed in the lacquer coating compositions of our invention include compounds having the following general formula:

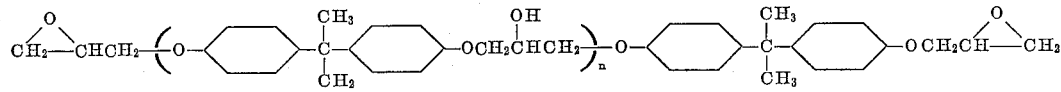

wherein $n$ is a value from 0 to 2.

The cellulose acetate butyrate may have a butyryl content of about 36 to 42%, a hydroxyl content of 1 to 4%, and a viscosity of 0.05 to 25 seconds as determined by the ASTM-D-1343-56 and ASTM-D-871-56.

A wide variety of pigments, in amounts ranging up to 50 parts by weight of the non-volatile ingredients, may be employed satisfactorily in the lacquer coating compositions of our invention.

The solvent system for the non-volatile ingredients should be selected to obtain a homogeneous solution. A wide variety of ketones, alcohols, esters, and hydrocarbons, and mixtures thereof, are satisfactory for this purpose. A solvent system comprising isobutyl acetate, methylethylketone, and isobutyl alcohol is especially useful.

The lacquer coatings of our invention may be cured to a high gloss finish at elevated temperatures. We prefer to cure the coatings at about 300° F. for about 30 minutes.

The generally useful ranges for the non-volatile ingredients of lacquer coating compositions in accordance with our invention are as follows:

| Ingredients: | Parts by weight |
| --- | --- |
| Cellulose acetate butyrate | 20–50 |
| Alkylated urea-formaldehyde resin | 20–60 |
| Epoxy compound | 10–30 |
| Acid catalyst | 0.1–5 |
| Pigment | 0–50 |

For example, lacquer compositions comprising about 40 parts cellulose acetate butyrate, about 40 parts of butylated urea-formaldehyde resin, about 20 parts epoxy compound, and about 1.5 parts acid catalyst make useful compositions in accordance with our invention. Cellulose acetate propionate may be used in place of the cellulose acetate butyrate.

*Wrinkle finishes.*—In general, wrinkle coatings may be obtained by adding an amine to the coating compositions described above. Cellulose acetate propionate may be used in the wrinkle coating composition in place of the cellulose acetate butyrate. The following examples demonstrate the preparation of wrinkle coatings in accordance with our invention.

*Example 5*

A lacquer coating composition having the following constituents was formulated:

| Ingredients: | Weight percent |
| --- | --- |
| Cellulose acetate butyrate (one-half second viscosity) [1] | 9.60 |
| Butylated urea-formaldehyde resin [2] | 15.60 |
| Polyglycidyl ether of an aliphatic polyol [3] | 5.30 |
| Triethylamine | 0.10 |
| p-Toluene sulfonic acid-butanol (50% mixture) | 0.80 |
| Toluene | 20.40 |
| Isobutyl acetate | 4.00 |
| Acetone | 31.00 |
| Methylisoamyl ketone | 13.20 |

[1] Commercially available as Half Second Butyrate.
[2] Available on the market as Uformite F-240.
[3] Available on the market as Epon 812.

The formulation contained 24.76% non-volatile constituents. The lacquer was prepared by combining all the film-forming materials into solution and then adding, at brief intervals, the triethylamine and the p-toluene sulfonic acid with stirring. The lacquer is stable for approximately nine weeks. The lacquer was sprayed onto polished aluminum, steel, brass, and chrome metallic surfaces at a thickness of 1–5 mils. The coating was dried for about one hour at room temperature, and was further cured for 15 minutes at 250° F. and then 15 minutes at 350° F. A clear, wrinkle finish was obtained.

*Example 6*

A lacquer was prepared in accordance with Example 5 and a small amount of Eastman GLF Yellow Dye in acetone was added thereto. The lacquer was then sprayed on an aluminum sheet and cured as in Example 5. A yellow-colored wrinkle coating was obtained.

*Example 7*

A small amount of Eastone Brilliant Fast Red 2B GLF Dye in acetone was substituted for the yellow dye in Example 6. The lacquer was sprayed onto an aluminum surface, and a red-colored wrinkled coating was obtained.

Example 8

A wrinkle lacquer coating composition was prepared having the following constituents:

| Ingredients: | Weight percent |
|---|---|
| Cellulose acetate butyrate [1] (one-half second) | 5.60 |
| Cellulose acetate butyrate [1] (one-half second) with 10% black pigment [2] | 3.80 |
| Butylated urea-formaldehyde resin [3] | 15.20 |
| Polyglycidyl ether of an aliphatic polyol [4] | 5.30 |
| Triethylamine | 0.50 |
| p-Toluene sulfonic acid in n-butanol (50% mixture) | 1.90 |
| Toluene | 20.90 |
| Isobutyl acetate | 4.60 |
| Acetone | 23.50 |
| Methylisoamyl ketone | 18.70 |

[1] Commercially available as Half Second Butyrate.
[2] Available on the market as Neo-Spectra Mark I.
[3] Available on the market as Uformite F-240.
[4] Available on the market as Epon 812.

As in Example 5, the amine and the p-toluene sulfonic acid were added at brief intervals with stirring. The lacquer was found to be stable over a two-month period. The lacquer was sprayed onto aluminum at a thickness of about 1–5 mils. The gloss and degree of wrinkle were controlled by varying the baking temperature of various sample at 250° F.–450° F. for 15–30 minutes. Excellent black wrinkle finishes were obtained.

Example 9

A blue pigmented wrinkle lacquer was formulated having the following compositions:

| Ingredients: | Weight percent |
|---|---|
| Cellulose acetate butyrate (one-half second) [1] | 8.60 |
| Cellulose acetate butyrate (one-half second) with pigment [2] | 1.00 |
| Butylated urea-formaldehyde resin [3] | 15.30 |
| Polyglycidyl ether of an aliphatic polyol [4] | 5.30 |
| Triethylamine | 0.50 |
| p-Toluene sulfonic acid-n-butanol (50% mixture) | 2.00 |
| Toluene | 21.10 |
| Isobutyl acetate | 4.70 |
| Acetone | 23.10 |
| Methylisoamyl ketone | 18.40 |

[1] Commercially available as Half Second Butyrate.
[2] 57% celluloseacetate butyrate, 23% titanium dioxide, and 20% Ramapo Blue BP-366D.
[3] Available on the market as Uformite F-240.
[4] Available on the market as Epon 812.

The p-toluene sulfonic acid and the amine were again added at brief intervals with stirring, and the lacquer was coated on aluminum and cured as in Example 8. Excellent blue wrinkle finishes were obtained.

Example 10

Lacquer compositions were formulated in accordance with Examples 5, 8, and 9, and 0.1% of a polymethyl siloxane having a molecular weight of 500 to 100,000 and 0–5 mole percent cross-linked, available on the market as Dow Corning F-4290, was added to the lacquers. Cured finishes obtained from these compositions showed a definite pattern comprising areas of wrinkling and other areas free from wrinkling. The substitution of another polymethyl siloxane having a molecular weight of 500 to 100,000 and 0–5 mole percent cross-linked, available on the market as Sylad 16, produced similar effects.

Example 11

Sucrose acetate isobutyrate (U.S. Patent No. 2,931,802) was added to the lacquer compositions of Examples 5–8 at 20% of the non-volatile ingredients. No changes were produced in the coatings by the addition of this extender and modifier, but its lower viscosity permitted a higher non-volatile solution and reduced solvent requirements.

Example 12

An aluminum wrinkle finish was prepared by adding a small amount of powdered aluminum to the lacquer described in Example 5.

Example 13

A gold-colored wrinkle finish was obtained by adding powdered bronze to the lacquer coating composition described in Example 5.

Example 14

Wrinkle coated panels prepared from Examples 5–8 were vacuum metallized with aluminum to produce a reflective wrinkle coating.

Example 15

Cellulose acetate butyrate having about 37% butyryl and a viscosity of about 0.1 second was substituted for the one-half second butyrate in Example 5. The lacquer so formulated produced a wrinkle finish which had essentially the same properties.

Example 16

Cellulose acetate butyrate having about 37% butyryl and a viscosity of about 20 seconds was substituted for the cellulose butyrate in Example 5. Good wrinkle coatings were obtained, although the tendency to wrinkle was somewhat reduced as compared to the wrinkle coatings obtained in Example 5.

Example 17

The triethylamine employed in Example 5 was replaced by tributylamine and wrinkle coatings were obtained having essentially the same properties as those obtained in Example 5.

Example 18

The p-toluene sulfonic acid of Example 5 was replaced with a 50% mixture of sulfoacetic acid monohydrate in butanol, and another lacquer was prepared in accordance with Example 5 except that a 50% mixed alkane sulfonic acid (of the type described in U.S. Patent No. 2,875,164) in butanol was substituted for the p-toluene sulfonic acid. Both lacquers produced satisfactory wrinkle coatings.

Example 19

The triethylamine employed in Example 5 was replaced by diethylamine, and wrinkle coatings were obtained having essentially the same properties as those obtained in Example 5.

Example 20

The triethylamine employed in Example 5 was replaced by ethylbutylamine, and wrinkle coatings were obtained having essentially the same properties as those obtained in Example 5.

Example 21

Cellulose acetate propionate having about 48% propionyl content and a viscosity of about 0.3 second was substituted for the cellulose acetate butyrate in Example 5. Wrinkle coatings were obtained having essentially the same properties as those obtained in Example 5.

The cellulose acetate butyrate esters which we have found suitable for the preparation of the wrinkle coatings may have a butyryl range of about 35–50% butyryl, a 1–4% hydroxyl content, and a viscosity range of from 0.1 to 20 seconds.

The urea-formaldehyde resin preferably has the following composition: 1 mole urea, 1–2 moles formaldehyde, and 0.5-2 moles butyl alcohol. Isomers and higher molecular weight monohydric alcohols may be substituted for a portion of the butanol.

The epoxy compounds which have been found to yield satisfactory wrinkle finishes may range in epoxide equivalent from 140 to 750, and are compounds of the type formed by the reaction of epichlorohydrin with a polyhydric compound, such as a bisphenol or ethylene glycol. We prefer to employ a polyglycidyl ether of an aliphatic polyol (such as sold under the trade name Epon 812), or epoxy resins having the following general formula:

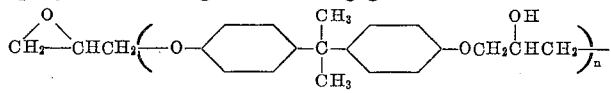 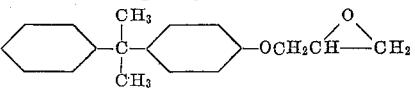

wherein $n$ is a value from 0 to 2.

The amines which we have found to be useful in our lacquer coating compositions include the secondary and tertiary aliphatic amines wherein each aliphatic group contains 2-4 carbon atoms. Secondary aliphatic amines (wherein each aliphatic group contains 2-4 carbon atoms)

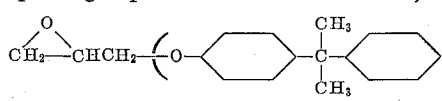 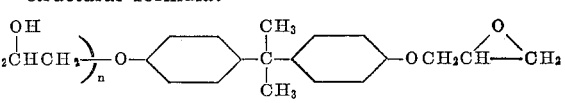

useful in our composition are diethylamine, dipropylamine, dibutylamine, ethylpropylamine, ethylbutylamine, and propylbutylamine.

Tertiary aliphatic amines (wherein each aliphatic group contains 2-4 carbon atoms) useful in our composition are triethylamine, tripropylamine, tributylamine, diethylpropylamine, diethylbutylamine, ethyldipropylamine, dipropylbutylamine, ethyldibutylamine, propyldibutylamine, and ethylpropylbutylamine. Especially satisfactory results are obtained with triethylamine.

The amine may be employed at various concentrations of from 0.1 to 20% of the non-volatile constituents, the higher concentrations producing a greater degree of wrinkle. However, excessively high concentrations of amine reduce the solution stability.

The organic acid catalysts may be incorporated in concentrations up to 20% with the higher concentrations increasing the rate of cure but reducing the solution stability somewhat. The acid catalysts described in U.S. Patent No. 2,631,138 may be employed as catalysts, but we prefer to use p-toluene sulfonic acid, sulfoacetic acid monohydrate, or mixed alkane sulfonic acids, such as described in U.S. 2,875,164, in lacquers designed to give wrinkle coatings.

Our coatings may be advantageously cured to a wrinkle finish by baking at elevated temperatures, say 250°–450° F. We prefer to give the coating a final bake of about 350° for about 15 minutes to produce scuff and mar resistant wrinkle coatings.

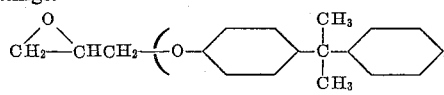

The general useful range of constituents of the wrinkle coating compositions of our invention are as follows:

Ingredients: Parts by weight
- Cellulose acetate butyrate _____ 20–50
- Alkylated urea-formaldehyde resin _____ 20–60
- Epoxy resin _____ 10–30
- Acid catalyst _____ 0.1–10
- Amine _____ 0.1–10
- Pigment _____ 0–50
- Dyes _____ 0–10

The amine and the acid catalyst may be added separately to the other ingredients, but the time interval between the addition of these ingredients should be less than 24 hours.

The invention has been described in considerable detail with particular reference to certain preferred embodiments thereof, but it will be understood that variations and modifications can be effected within the spirit and scope of the invention as described hereinabove and as defined in the appended claims.

Having thus described our invention, we claim:

1. A lacquer coating composition, the essential constituents of which comprise in a solvent therefor:
   (A) 20–40 parts of a mixed fatty acid ester of cellulose containing fatty acid radicals of 2 to 4 carbon atoms,
   (B) 20–60 parts of an alkylated urea-formaldehyde resin,
   (C) 10–30 parts of an epoxy compound selected from the group consisting of the polyglycidyl ethers of aliphatic polyols and compounds having the following structural formula:

wherein $n$ is a value from 0 to 2,
   (D) 0.1–10 parts of an acid catalyst, and
   (E) 0.1–10 parts of an amine selected from the group consisting of the secondary and tertiary aliphatic amines wherein each aliphatic group contains 2–4 carbon atoms.

2. The composition of matter as defined in claim 1 wherein the mixed fatty acid ester of cellulose is cellulose acetate propionate.

3. The composition of matter as defined in claim 1 wherein the fixed fatty acid ester of cellulose is cellulose acetate butyrate.

4. The composition of matter as defined in claim 1 wherein the amine is diethylamine.

5. The composition of matter as defined in claim 1 wherein the amine is ethylbutylamine.

6. The composition of matter as defined in claim 1 wherein the amine is triethylamine.

7. The composition of matter as defined in claim 1 wherein the amine is tributylamine.

8. A lacquer coating composition, the essential constituents of which comprise in a solvent therefor:
   (A) 20–40 parts cellulose acetate butyrate having a butyryl content of about 35–50%, a hydroxyl content of 1–4%, and a viscosity range of from 0.1 to 20 seconds,
   (B) 20–60 parts of a butylated urea-formaldehyde resin,
   (C) 10–30 parts of an epoxy compound selected from the group consisting of the polyglycidyl ethers of aliphatic polyols and compounds having the following structural formula:

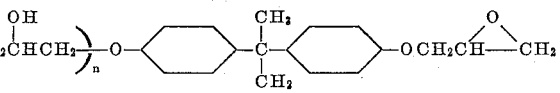

wherein $n$ is a value from 0 to 2,
   (D) 0.1–10 parts of an acid catalyst, and
   (E) 0.1–10 parts triethylamine.

9. A lacquer coating composition, the essential constituents of which comprise in a solvent therefor:
   (A) 20–40 parts cellulose acetate butyrate having a butyryl content of about 35–50%, a hydroxyl content of 1–4%, and a viscosity range of from 0.1 to 20 seconds,
   (B) 20–60 parts of a butylated urea-formaldehyde resin,
   (C) 10–30 parts of an epoxy compound selected from the group consisting of the polyglycidyl ethers of aliphatic polyols and compounds having the following structural formula:

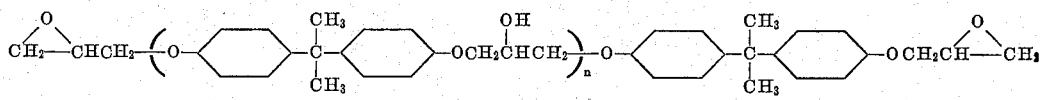

wherein $n$ is a value of from 0 to 2,
(D) 0.1–10 parts of an acid catalyst,
(E) 0.1–10 parts triethylamine, and
(F) 0–50 parts of a pigment.

10. A lacquer coating composition comprising, by weight, about 9.5% cellulose acetate butyrate having a one-half second viscosity, a butyryl content of about 37%, and a hydroxyl content of about 1 to 4%; about 15.5% butylated urea-formaldehyde resin; about 5.5% polyglycidyl ether of an aliphatic polyol; about 0.1% triethylamine; about 0.8% of a 50% mixture of p-toluene sulfonic acid and butanol; about 20% toluene; about 4% isobutyl acetate; about 31% acetone; and about 13% methylisoamyl ketone.

11. Metal surfaces having a coating thereover comprising the reaction products of the non-volatile components of claim 1.

12. Metal surfaces having a coating thereover comprising the reaction products of the non-volatile components of claim 8.

13. The composition of matter as defined in claim 1 wherein the aliphatic polyol is ethylene glycol and the acid catalyst is p-toluene sulfonic acid.

14. An article comprising a structure having thereon a coating comprising in a solvent therefor:
(A) 20–40 parts of a mixed fatty acid ester of cellulose containing fatty acid radicals of 2 to 4 carbon atoms,
(B) 20–60 parts of an alkylated urea-formaldehyde resin,
(C) 10–30 parts of an epoxy compound selected from the group consisting of the polyglycidyl ethers of aliphatic polyols and compounds having the following structural formula:

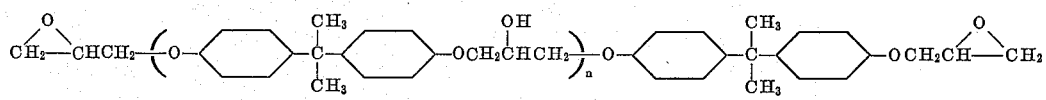

wherein $n$ is a value from 0 to 2,
(D) 0.1–10 parts of an acid catalyst, and
(E) 0.1–10 parts of an amine selected from the group consisting of the secondary and tertiary aliphatic amines wherein each aliphatic group contains 2–4 carbon atoms.

No references cited.

WILLIAM H. SHORT, *Primary Examiner.*

J. NORRIS, *Assistant Examiner.*